(12) United States Patent
Rajvanshi et al.

(10) Patent No.: US 11,069,093 B2
(45) Date of Patent: Jul. 20, 2021

(54) GENERATING CONTEXTUALIZED IMAGE VARIANTS OF MULTIPLE COMPONENT IMAGES

(71) Applicant: Adobe Inc., San Jose, CA (US)

(72) Inventors: Tushar Rajvanshi, Meerut (IN); Sourabh Gupta, Noida (IN); Ajay Bedi, Himachal Pardesh (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/395,428

(22) Filed: Apr. 26, 2019

(65) Prior Publication Data
US 2020/0342635 A1    Oct. 29, 2020

(51) Int. Cl.
  *G06T 11/00* (2006.01)
  *G06T 7/13* (2017.01)
  *G06T 11/20* (2006.01)

(52) U.S. Cl.
  CPC ............. *G06T 11/001* (2013.01); *G06T 7/13* (2017.01); *G06T 11/203* (2013.01)

(58) Field of Classification Search
  CPC ........ G06T 11/001; G06T 11/203; G06T 7/13
  See application file for complete search history.

(56) References Cited

U.S. PATENT DOCUMENTS

| | | | | |
|---|---|---|---|---|
| 2010/0030578 A1* | 2/2010 | Siddique | ............... | G06Q 40/12 705/3 |
| 2011/0210915 A1* | 9/2011 | Shotton | .............. | G06K 9/00369 345/157 |
| 2013/0127889 A1* | 5/2013 | Winnemoeller | ...... | G06T 11/001 345/582 |
| 2019/0035149 A1* | 1/2019 | Chen | ......................... | G06T 7/50 |
| 2019/0122404 A1* | 4/2019 | Freeman | ................. | G06T 7/251 |
| 2019/0178654 A1* | 6/2019 | Hare | ......................... | G06T 7/70 |

OTHER PUBLICATIONS

How to Add Product Variations in WooCommerce Sep. 6, 2016 https://www.youtube.com/watch?v=wqIRtry1L5I.
How to Add Patterns to Clothing in Photoshop Jun. 28, 2016 https://www.youtube.com/watch?v=GT0SCP2V620.

* cited by examiner

*Primary Examiner* — Kee M Tung
*Assistant Examiner* — Khoa Vu
(74) *Attorney, Agent, or Firm* — Kilpatrick Townsend & Stockton LLP

(57) ABSTRACT

In some embodiments, contextual image variations are generated for an input image. For example, a contextual composite image depicting a variation is generated based on a input image and a synthetic image component. The synthetic image component includes contextual features of a target object from the input image, such as shading, illumination, or depth that are depicted on the target object. The synthetic image component also includes a pattern from an additional image, such as a fabric pattern. In some cases, a mesh is determined for the target object. Illuminance values are determined for each mesh block. An adjusted mesh is determined based on the illuminance values. The synthetic image component is based on a combination of the adjusted mesh and the pattern from the additional image, such as a depiction of the fabric pattern with stretching, folding, or other contextual features from the target image.

20 Claims, 9 Drawing Sheets
(5 of 9 Drawing Sheet(s) Filed in Color)

GENERATING CONTEXTUALIZED IMAGE VARIANTS OF MULTIPLE COMPONENT IMAGES

TECHNICAL FIELD

This disclosure relates generally to generating context-sensitive image variations for component images. More specifically, but not by way of limitation, the present disclosure involves generating images depicting simulated contextual patterns or textures based on component patterns or textures extracted from an image depicting a material in an environment.

BACKGROUND

The widespread use of image processing has led to increasing need to replace portions of images with variations. Current approaches to incorporating variations into images require manual effort by a person such as a graphical image editor, including manual identification of an object of interest within an image and subsequent manual mapping of a synthetic variation of the identified object. This requires excessive amounts of time and energy from at least one person who is trained to use image editing software, and the accuracy of the image variation depends on the skill and training of the graphical image editor. It is desirable to automate techniques to generate image variations, such as to reduce time and image processing resources used for generating the variations.

Conventional attempts to automate image variation techniques have failed to incorporate contextual features that cause an image variation to look realistic. Examples of these contextual features include depth, shading, and illumination of the object in the context of the image. For instance, a conventional image variation system generates an image variation of an object having a certain context (e.g., depth, shading, illumination) by merely replacing the object with a "flat" synthetic component. In this image variation, the contextual features of the object in the environment depicted in the image are lost.

Therefore, it is desirable to provide techniques that reduce resources required (e.g., including computing resources, time spent, etc.) to generate realistic image variations that incorporate contextual features of an object in the variation.

SUMMARY

Certain embodiments involve determining a target object depicted in a received input image. A rectangular mesh is generated, the mesh including rectangles that correspond to respective portions of the target object. For each rectangle, an illuminance value is generated. Each illuminance value is based on at least one directional derivative for the respective rectangle. A classification is determined for the respective rectangle based on the directional derivative. In some cases, the classification indicates a shading or a reflectance for a portion of the target object that corresponds to the respective rectangle. In some embodiments, a dimension is adjusted for at least one rectangle from the rectangular mesh. The adjustment is based on the respective illuminance value corresponding to the rectangle. In some cases, a synthetic image component is generated based on the adjusted dimension of the rectangle and a pattern depicted in an additional image. A contextual composite image is generated based on a combination of the input image and the synthetic image component.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

Figure 1:
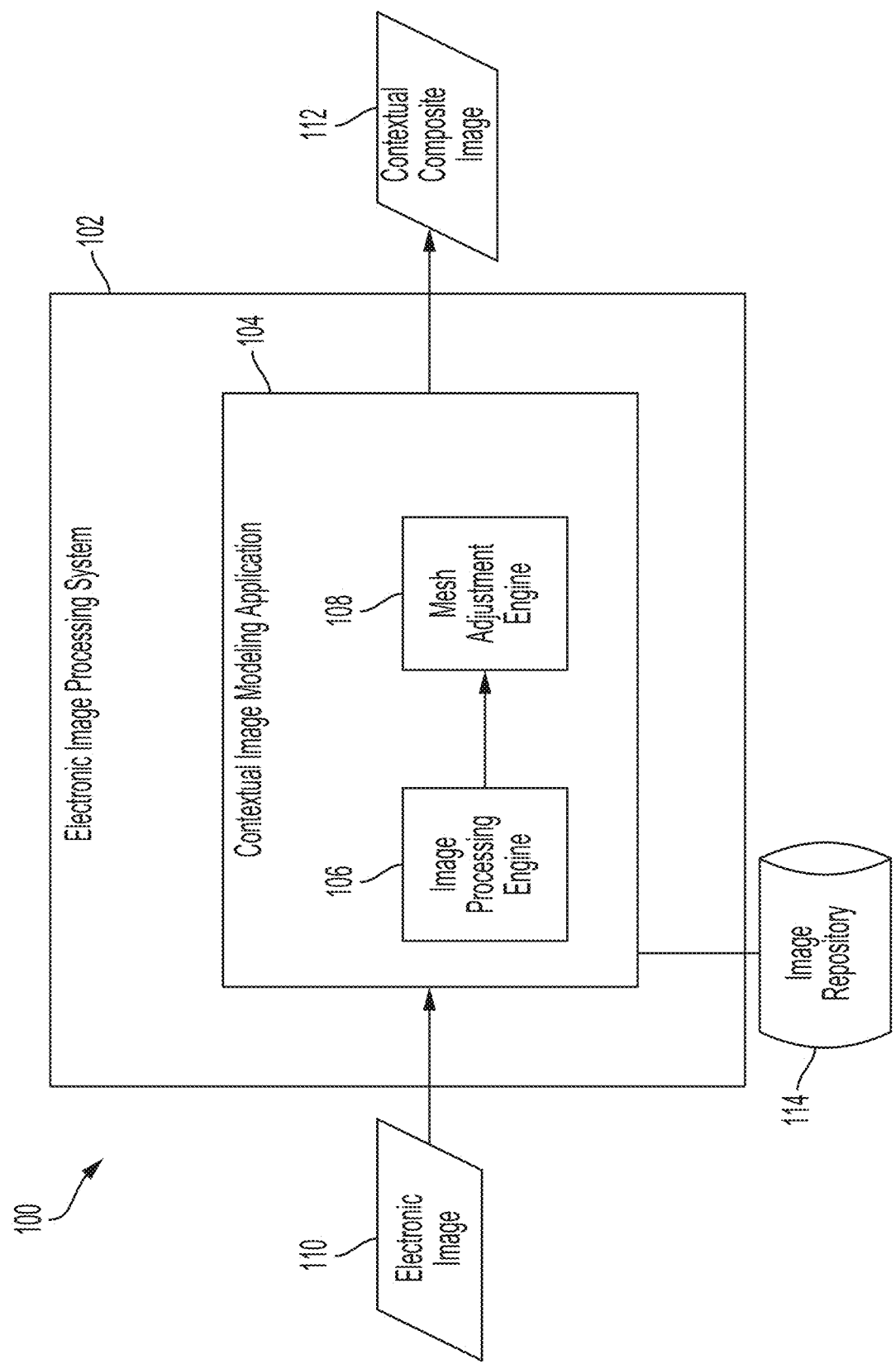
FIG. 1 depicts an example of a computing environment in which a contextual image modeling application generates contextualized image variants of multiple component images, according to certain embodiments of the present disclosure.

The patent or application file contains at least one drawing executed in color. Copies of this patent or patent application publication with color drawing(s) will be provided by the Office upon request and payment of the necessary fee.

DETAILED DESCRIPTION

Certain embodiments provide improvements to computing systems used for modifying images or other graphical content that visually represent one or more objects or visual content components. For instance, as described herein, existing image variation techniques entail cumbersome or time-consuming manual processes for generating a synthetic component that accurately depicts the contextual features of an electronic image, such as shading, illumination, depth, or other contextual features. These problems can be addressed by various methods disclosed herein.

The following non-limiting examples is used to introduce certain embodiments. In this example, a contextual image modeling application receives an input image that depicts a target object, such as a figure wearing a garment, for which a contextual image variation is to be generated. The contextual image modeling application also receives one or more inputs indicating a variation for the object, such as inputs identifying an additional image depicting a fabric pattern for the garment. To create an image variation that includes context, such as realistic-looking shadows and folding, the contextual image modeling application extracts a boundary of the target object and generates a mesh from the boundary. The mesh includes a set of rectangular blocks that correspond to respective portions of the target object.

Continuing with this example, the contextual image modeling application determines respective illuminance values for rectangular blocks in the mesh. The illuminance values are determined based on directional derivatives and associated classifications of the rectangular blocks. For example, if the directional derivative indicates that a luminance between adjacent pixels is increasing, the rectangular block is classified as having a reflectance illuminance value (e.g., a shiny surface). If the directional derivative indicates that the luminance between adjacent pixels is decreasing, the rectangular block is classified as having a shading illuminance value (e.g., a shadowed surface). The contextual image modeling application adjusts dimensions of one or more rectangular blocks based on the illuminance values. For instance, if a rectangular block has a reflectance illuminance value, the contextual image modeling application increases one or more of the height, width, or aspect ratio for the rectangular block such as to indicate folding in a fabric. Additionally or alternatively, if a rectangular block has a shading illuminance value, the contextual image modeling application adjusts one or more of the height, width, or aspect ratio for the rectangular block such as to indicate stretching in a fabric. In this example, adjusting the dimensions of the rectangular blocks based on the respective illuminance value allows location adjustments for pixels of the additional image depicting the fabric pattern, such as to indicate apparent stretching or folding in the fabric pattern.

The contextual image modeling application uses the illuminance values to generate a realistic contextual image variant. For instance, the contextual image modeling application generates a synthetic image component based on the adjusted dimensions and the additional image provided by the graphical editor. The contextual image modeling application generates a contextual composite image by combining the input image and the synthetic image component. The contextual composite image (i.e., the contextual image variant) depicts a variation of the context depicted in the input image, such as the garment worn by the figure being replaced with the pattern from the additional image. In the contextual composite image, for instance, the pattern from the additional image is depicted with shadows and folding that appear realistic in the environment depicted in the input image.

In some embodiments, a contextual image modeling application improves the appearance of generated image variations by applying one or more computer-implemented techniques to generate realistic-looking contextual features of the image variations. For example, one or more of an image processing engine or a mesh adjustment engine that are included in a contextual image modeling application generate a synthetic image component based on a sequence of computer-implemented operations for generating or adjusting a mesh, determining an illuminance value, generating a synthetic image component based on determined data structures or values, or other described techniques. Such computer-implemented techniques allow for generating contextual composite images with a synthetic image component more accurately and efficiently than existing techniques, and provide improvements to the generation of contextualized image variations. In some cases, the contextualized image variations that are generated via the described techniques are generated more rapidly and using fewer computer resources than conventional image variations generated via manual effort, and appear more realistic than non-contextual image variations (which may appear flat and artificial).

As used herein, the term "contextual feature" is used to refer to shading and luminance characteristics of an electronic image. An example of a contextual feature is a region of an electronic image where shading characterizes a shadow cast by a surface (e.g., shadow of a texture, a shadow of a fold) depicted in the electronic image. An additional example of a contextual feature is a region of an electronic image where luminance characterizes a highlight reflected on a surface (e.g., light reflected from a shiny surface).

As used herein, the term "contextual composite image" is used to refer to an image that is based on a combination of, at least, an image with no contextual features, and an adjusted mask structure that contains indications of contextual features of another image. An electronic image, including a contextual composite image, includes a data structure comprising pixels that are each associated with a color value (e.g., black-and-white, greyscale, red-green-blue) and a location in the electronic image.

Referring now to the drawings, FIG. 1 depicts an example of a computing environment in which a contextual image modeling application generates contextualized image variants of multiple component images, according to certain embodiments of the present disclosure. In various embodiments, the computing environment 100 includes an electronic image processing system 102 and a contextual image modeling application 104 executed by one or more computing devices.

The contextual image modeling application 104 is a software application that provides an image processing engine 106 and a mesh adjustment engine 108 The contextual image modeling application 104 is configured for generating a contextual composite image 112. The contextual image modeling application 104 includes one or more sets of program code that modify the content of a contextualized electronic image (e.g., by generating a contextual composite image with a synthetic image component). Examples of this program code include program code for extracting a boundary from an electronic image, program code for generating an illuminance map and computing a shading image, program code for generating an adjusted mesh structure from the illuminance map, program code for generating a synthetic image component from an additional image based on the generated adjusted mesh structure, and program code for generating a contextual composite image from the synthetic image component and an additional electronic image.

The computing environment 100 also includes storage components for various data sets. These storage components are local to the computing device that executes the contextual image modeling application 104 (e.g., accessible via a data bus), or are remotely located and accessible via a network connection, or some combination thereof. For instance, a storage component includes a solid-state memory device, a magnetic storage device, a database, or any suitable non-transitory computer-readable medium.

In this example, the contextual image modeling application 104 receives an electronic image 110. A electronic image 110 includes various pixels that indicate visual content, such as an object or background in a scene depicted in the image 110. One example of the electronic image 110 is a visual representation of a physical scene that has multiple image components, such as one or more objects or a background. Non-limiting examples of objects include human figures, non-human figures (e.g., animals, mannequins), accessories or clothing held or worn by the figures, inanimate items, or other suitable objects. In some cases, the electronic image 110 includes a target object, such as an object that is indicated as or determined to be an object intended for variation (e.g., targeted for synthetic variations)

The contextual image modeling application 104 includes an image processing engine 106. In some cases, the image processing engine 106 includes one or more trained neural networks to perform various image processing operations as described herein. For example, the image processing engine 106 is a neural network trained to extract features of the electronic image 110 (e.g., an object, a background). The image processing engine 106 extracts a boundary from the electronic image 110, such as boundary extraction based on one or more neural network techniques. An example of the boundary is an edge of a target object included in the electronic image 110. The image modeling application 104 generates a binary mask from the boundary indicating a shape of the extracted features. For instance, the image processing engine 106 may extract a portion of the pixels of the electronic image representing locations within the boundary. In some cases, the image processing engine 106 determines that another portion of the pixels of the electronic image 110 external to the boundary represent a background.

In some cases, the contextual image modeling application 104 generates a mesh, such as a rectangular mesh, from the binary mask. The contextual image modeling application 104 generates a mesh defined by a quantity of mesh blocks, such as rectangles. For example, the contextual image modeling application 104 generates a quantity of rectangles N based on a relationship of the total area $A_m$ the binary mask and a granularity that is represented by a base rectangle area (e.g., a height h times a width w). The contextual image modeling application 104 may represent this computation by the representation $$N = \frac{A_m}{h*w}.$$

The contextual image modeling application 104 determines the quantity of rectangles such that each rectangle corresponds to a portion of the shape and collectively, the rectangular mesh represents the complete shape. The contextual image modeling application 104 generates an illuminance map for the rectangular mesh. The contextual image modeling application 104 generates the illuminance map that includes at least one illuminance value corresponding to each rectangle of the rectangular mesh. The contextual image modeling application 104 decomposes the electronic image 110 into two components corresponding to an image that represents the shading and an image that represents the reflectance. The contextual image modeling application 104 performs the decomposition by computing a derivative of each rectangle of the rectangular mesh in two dimensions. Although the examples described by FIG. 1 include a rectangular mesh, other embodiments are possible, such as a mesh based on triangular blocks, hexagonal blocks, irregularly shaped blocks, or other suitable mesh block types.

The contextual image modeling application 104 represents the electronic image 110 by I(x, y), where I(x, y) represents one or more features of the electronic image 110. For instance, the contextual image modeling application 104 represents that approximates the interaction of the pixel and an illumination in the electronic image 110. In some cases, the electronic image 110 I(x, y) is a product of the shading image S(x, y) and the reflectance image R(x, y), but other functions are possible, such as a scaled product. The contextual image modeling application 104 determines a classification for the derivative for each rectangle as being caused by the shading image S(x, y) or reflectance image R(x, y). Additional description of the classification process is included with regard to FIG. 2.

For representing diffuse surfaces in an image, the contextual image modeling application 104 determines that a proportional change across the channels of the image pixels, such as red, green, and blue component values (RGB) is associated with a change in luminance that is classified as reflectance (i.e., the pixel color has a higher luminance), or shading (i.e., the pixel color has a lower luminance). For instance, a first pixel has an RGB triplet [R,G,B] represented by $c_1$ and an adjacent pixel has an RGB triplet $c_2$. The contextual image modeling application 104 determines that a change between the first pixel and the second pixel is due to a reflectance or shading change, such as based on the relationship between $c_1$ and $ac_2$ where a is a scalar. For instance, if $c_1=ac_2$, the contextual image modeling application 104 classifies the pixels as part of the shading image. If $c_1 \neq ac_2$, the contextual image modeling application 104 classifies the pixels as part of the reflectance image. Although the examples described herein are described with regards to RGB color channels, other channels with other color types are possible, such as implementations based on greyscale channels or black-and-white channels.

The contextual image modeling application 104 generates an adjusted mesh structure by adjusting the rectangular mesh based on an illuminance value corresponding to at least one of the rectangles of the rectangular mesh. The contextual image modeling application 104 generates the adjusted mesh structure by applying mesh adjustment engine 108. For instance, the mesh adjustment engine 108 determines a directional adjustment at each block of the rectangular mesh based on the respective illuminance value that corresponds to the block. In some cases, a block having a lower luminance (e.g., shading) is adjusted to have a smaller respective value for one or more of a height, a width, or an aspect ratio, such as to indicate folding in a fabric. Additionally or alternatively, a block having a higher luminance (e.g., reflectance) is adjusted to have a larger respective value for one or more of a height, a width, or an aspect ratio, such as to indicate stretching in a fabric. Additional details of these adjustments are further described in regards to FIG. 2 or 3.

The contextual image modeling application 104 generates a synthetic image component based on a combination of the adjusted mesh structure and the additional image. The mesh adjustment engine 108 generates a synthetic image component by merging the adjusted mesh structure and an additional image, such as an image depicting a pattern (e.g., a pattern or texture of fabric). The adjusted mesh structure indicates variations of the illuminance or shading of the target object extracted from the electronic image 110. An example of the additional image is an additional electronic image that contains various visual elements such as a pattern, or scene. The contextual image modeling application 104 retrieves the additional electronic image from an image repository 114. The image repository 114 contains any number of electronic images and is local to the contextual image modeling application or accessed remotely, via a network.

In some cases, the contextual image modeling application 104 combines the adjusted mesh and the additional image to generate the synthetic image component. For example, the contextual image modeling application 104 selects a group of pixels from the additional image based on the binary mask indicating the target object's shape, as extracted from the input image. In some cases, the selected pixels form an additional shape corresponding to the shape extracted from the input image. The mesh adjustment engine 108 adjusts one or more of the locations or channels (e.g., RGB color values) of the selected pixels based on a corresponding block of the rectangular mesh. For example, a pixel with a location corresponding to a location of a respective mesh block has a directional adjustment, a channel adjustment, or both, based on the illuminance value of the respective mesh block. In some cases, for pixels corresponding to a mesh block with lower luminance (e.g., shading), a directional adjustment includes adjusting the pixels closer together, such as pixels that are moved together to indicate folding in a fabric. For pixels corresponding to a mesh block with higher luminance (e.g., reflectance), the directional adjustment includes adjusting the pixels farther apart, such as pixels that are moved apart to indicate stretching in fabric. Additionally or alternatively, for pixels corresponding to a mesh block with lower luminance (e.g., shading), a channel adjustment includes adjusting the luminance of the pixels to a lower value, such as to indicate shading in fabric. For pixels corresponding to a mesh block with higher luminance (e.g., reflectance), the channel adjustment includes adjusting the luminance of the pixels to a higher value, such as to indicate reflectance in fabric. The synthetic image component includes, for example, a combination of the selected pixels from the additional image (e.g., corresponding to the extracted shape) and the adjusted pixels (e.g., indicating folding or stretching in the pattern of the additional image). Additional details of the combination are further described in regards to FIGS. 4, 5, and 6.

The contextual image modeling application 104 generates a contextual composite image based on a combination of the input image and the generated synthetic image component. For example, the contextual image modeling application 104 generates a contextual composite image 112 that combines the synthetic image component and a portion of the electronic image 110. The contextual image modeling application 104 replaces pixels from the electronic image 110 with pixels from the synthetic image that correspond to the same location (or similar locations) in both images. The contextual image modeling application 104 preserves the pixels of the electronic image 110 that are at locations that do not correspond to a location of the synthetic image. As a non-limiting example, if the contextual image modeling application 104 generates a contextual composite image based on an input image depicting a red ball on a table and a synthetic image component including a polka-dot pattern, the contextual image modeling application 104 could replace pixels at locations corresponding to the red ball (e.g., where the object for the red ball was extracted) with pixels corresponding to the polka-dot pattern. In this example, the contextual image modeling application 104 could preserve pixels at locations corresponding to the table, such that the example contextual composite image depicts an image of a polka-dot ball on the table.

Figure 2:
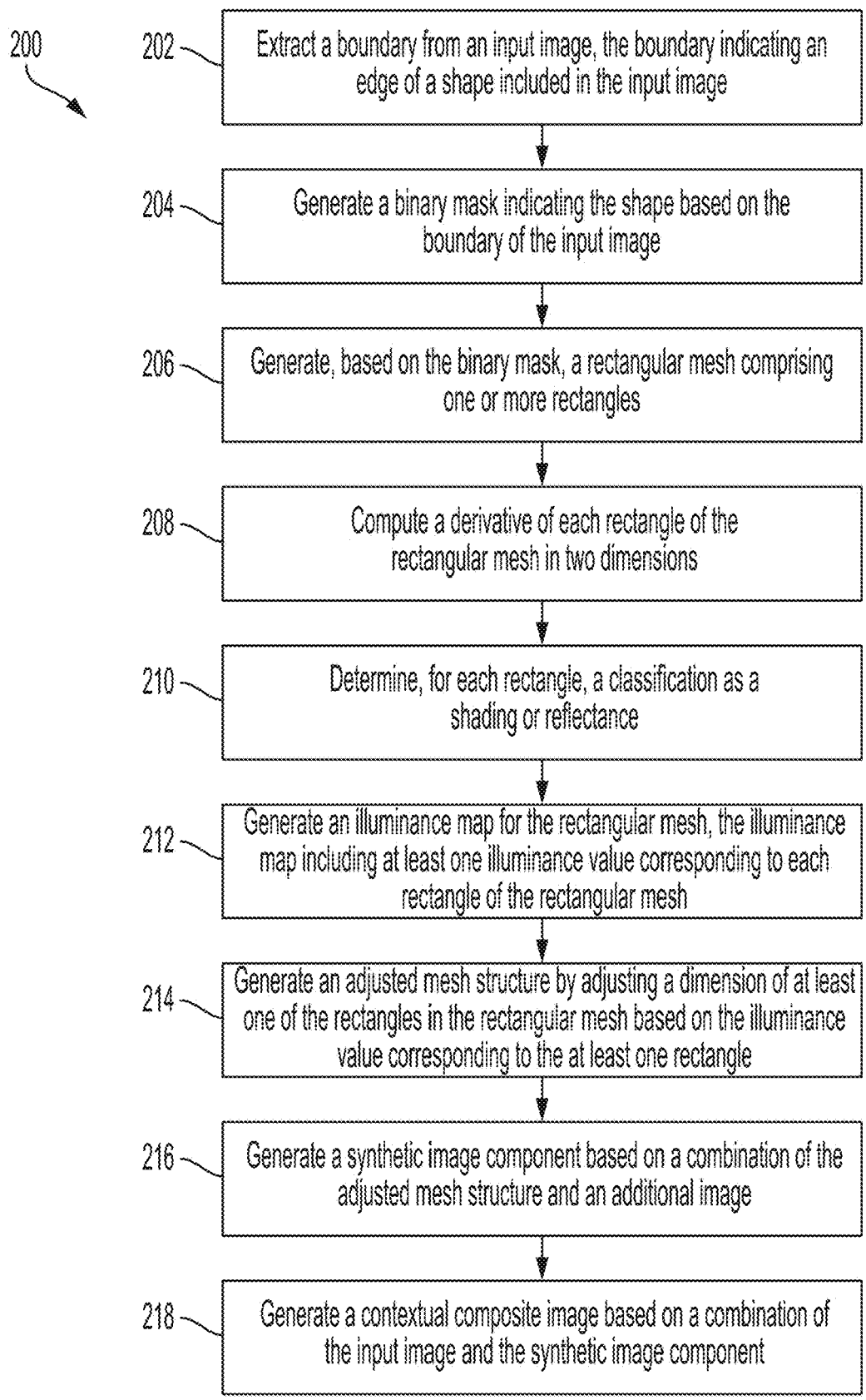
FIG. 2 depicts an example of a process for generating a contextual composite image based on a combination of the input image and the synthetic image component, according to certain embodiments of the present disclosure.

FIG. 2 depicts an example of a process 200 for generating a contextual composite image based on a combination of an input image and a synthetic image component, according to certain embodiments of the present disclosure. One or more computing devices executing suitable program code (e.g., electronic image processing system 102, contextual image modeling application 104, the image processing engine 106, mesh adjustment engine 108) implement operations depicted by FIG. 2. For illustrative purposes, the process 200 is described with reference to certain examples depicted in the figures. Other implementations, however, are possible.

At block 202, the process 200 involves extracting a boundary from an input image, the boundary indicating an edge of a target object depicted in the input image. For instance, an image processing engine 106 of a contextual image modeling application 104 extracts a boundary by applying a neural network trained to detect one or more objects contained in an electronic image 110.

At block 204, the process 200 involves generating a binary mask based on the boundary of the electronic image, such as a binary mask indicating a shape of the target object. An example of a binary mask is a representation of an electronic image that indicates a region of the electronic image (such as an object depicted in the image). In some cases, the contextual image modeling application 104 generates the binary mask. For example, the image processing engine 106 generates the binary mask using trained deep learning models. The image processing engine 106 may be trained with a set of training images, such as a frontal portrait of a model and a clothing item. Other implementations, such as other perspectives or objects detected are possible (e.g., profile portrait, object detection is an accessory item).

Figure 3:
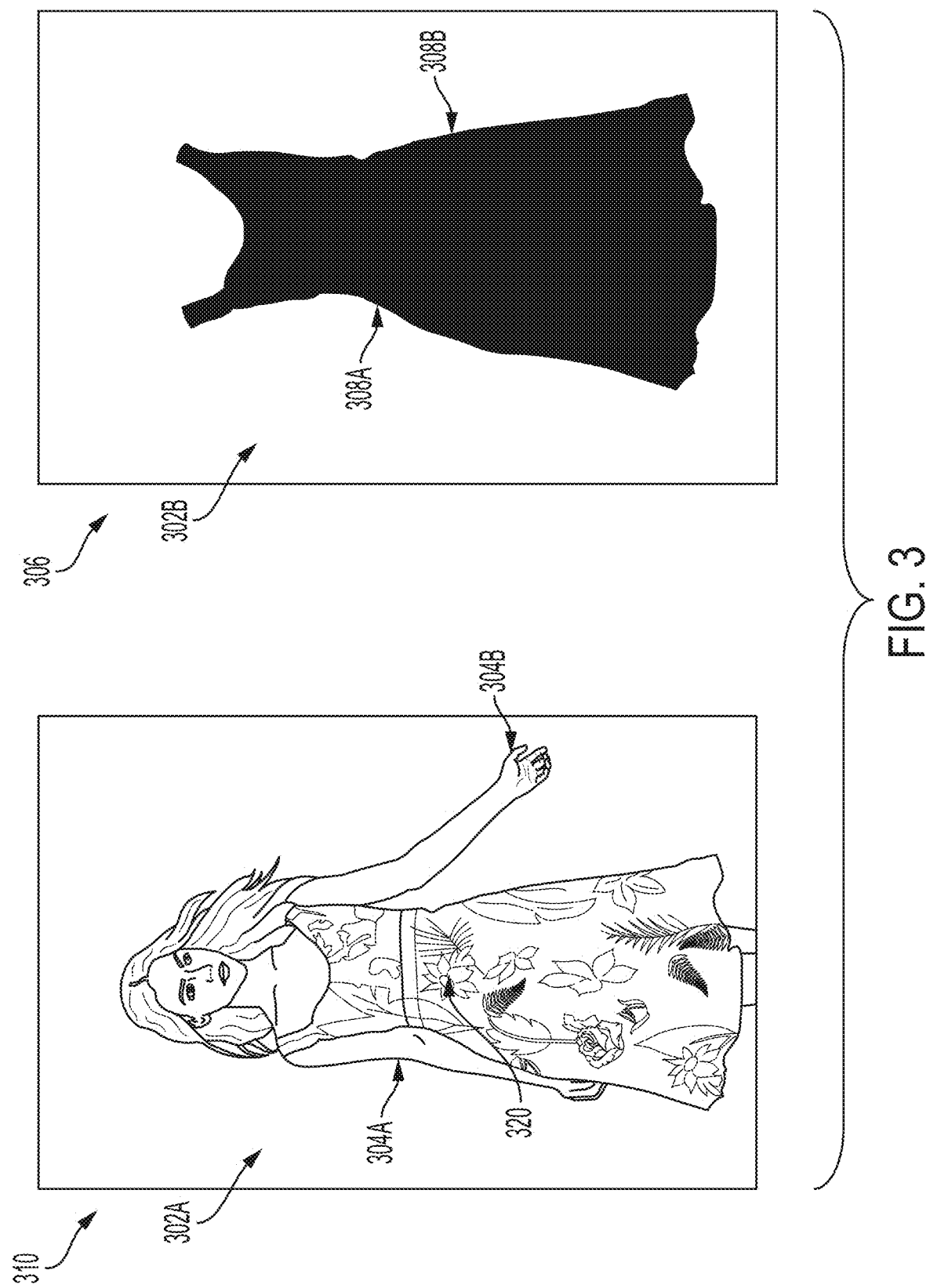
FIG. 3 depicts generating a binary mask from an electronic image, according to the present disclosure.

FIG. 3 depicts an example of a binary mask 306 generated based on an electronic image 310, such as via operations described in regards to FIG. 2. In some cases, the contextual image modeling application 104 generates the binary mask 306 via the image processing engine 106. For example, the image processing engine 106 applies neural network techniques, such as a trained deep learning model, to the electronic image 310. In some cases, the image processing engine 106 identifies features of the electronic image 310, such as features indicating colors, edges, semantic content, or other image features. The image processing engine 106 may be trained with a set of training images, such as a frontal portrait of a model and a clothing item. Other implementations, such as other perspectives or targeted objects are possible (e.g., profile portrait, target object is an accessory item).

In some embodiments, the image processing engine 106 detects one or more elements in the electronic image 310, such as a target object 320 (e.g., a figure in the image 310), or a background element, such as a background element 302A. Additionally or alternatively, the image processing engine 106 extracts one or more boundaries of the target object, such as a first boundary edge 304A and a second boundary edge 304B of the target object 320. In some cases, a background element, such as the background element 302A, is an element of an electronic image that does not indicate the target object of the image. The binary mask 306 is generated, for example, based on the extracted boundaries edges 304A and 304B. In some cases, the binary mask 306 includes an area with pixels, such as pixels with a color value of zero (e.g., indicated by the darker region). In addition, the binary mask 306 includes one or more mask boundaries indicating the edges of the target object, such as mask boundaries 308A and 308B, a background element 302B, or both boundaries and a background element.

Returning to FIG. 2 at block 206, the process 200 involves generating a mesh having multiple mesh blocks based on the binary mask. In some cases, the mesh is a rectangular mesh including multiple rectangular blocks that form a mesh having a shape similar to the shape of the binary mask. For example, the mesh includes a set of rectangular blocks having respective sizes and locations, such that the set of rectangular blocks corresponds to the shape of the target object. In some cases, the rectangular blocks have a same size. In some embodiments, the contextual image modeling application 104 generates a rectangular mesh by creating a data structure indicating a quantity of rectangles based on the area of the binary mask 306. The contextual image modeling application 104 adjusts the size (or sizes) of the rectangles such that a granularity of the mesh (e.g., a quantity of rectangles included in a given area of the mesh) is sufficient to represent the contextual features of the target object with high accuracy. For example, a rectangular mesh block has a height and a width. In some cases, the height and width have a value (e.g., a default value of 5) indicating a quantity of pixels to which the rectangular mesh block corresponds (e.g., a quantity of pixels that is 5 pixels high and 5 pixels wide). In some cases, the rectangles (or a subset of the rectangles) are modified to have a height and width that are relatively small, such that the mesh has a high granularity. A high-granularity mesh, for instance, more accurately represents details of contextual features (e.g., details of folds in fabric).

Figure 4:
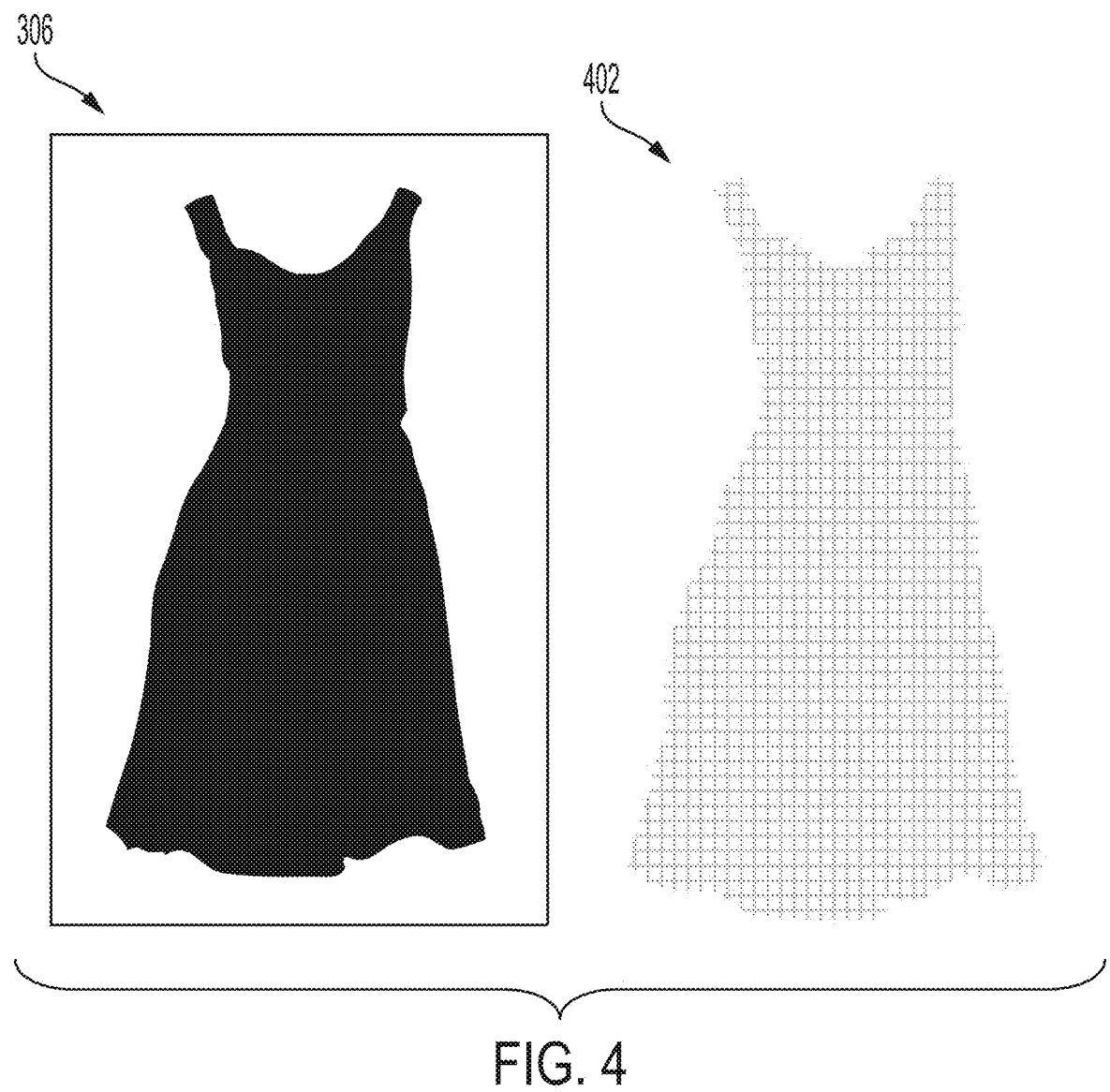
FIG. 4 depicts generation of a rectangular mesh structure for an electronic image, according to the present disclosure.

FIG. 4 depicts an example of a rectangular mesh generated based on an electronic image, according to the present disclosure. In some embodiments, the contextual image modeling application 104 generates a data structure representing a rectangular mesh 402 for the target object (e.g., in this example a dress). The contextual image modeling application 104 determines the number and size of rectangles, such as described with regard to FIGS. 1 and 2. In some cases, the contextual image modeling application 104 generates a set of rectangular blocks, such as rectangles in the rectangular mesh 402, that encompasses the area of the target object extracted from the electronic image 310, such as an area based on the mask 306. Based on the rectangular mesh 402, reference points are provided for the extracted object that can be used for additional operations. The image modeling application 104 modifies the rectangular mesh 402 as described with reference to FIGS. 1 and 2.

Additionally or alternatively, the contextual image modeling application 104 generates an additional rectangular mesh for additional portions of the input image, such as additional extracted objects or a background element. The contextual image modeling application 104 can compute the additional rectangular mesh (or meshes) for the additional portions in a similar manner as described with regard to FIGS. 1 and 2.

Returning to FIG. 2 at block 208, the process 200 involves computing a derivative of each rectangle of the rectangular mesh in two dimensions. For example, a contextual image modeling application 104 computes a derivative of the image colors in both the x (i.e., horizontal) and y (i.e., vertical) directions. The contextual image modeling application 104 computes the image derivative using filters $f_x$ and $f_y$. In some embodiments, the contextual image modeling application 104 applies the filter $f_x$ to determine a rate of change by computing, in each of the positive and negative horizontal directions, a discrete derivative between each pixel and an adjacent pixel. Similarly, the contextual image modeling application 104 applies the filter $f_y$ to determine a rate of change by computing, in each of the positive and negative vertical directions, a discrete derivative between each pixel and an adjacent pixel.

At block 210, the process 200 involves classifying each rectangle as corresponding to a shading or reflectance, such as a shading or reflectance of a corresponding portion of the target object. In some cases, the classification is based on the one or more derivatives of the respective rectangle. For instance, the contextual image modeling application 104 represents an electronic image represented by I(x, y) (such as the electronic image 110) as the product of a shading image S(x, y) and a reflectance image R(x, y). The product approximates the interaction of the pixel and an illumination in the electronic image 110. The contextual image modeling application 104 determines if the changes across the channels of an RGB pixel are proportional. Based on whether the changes are proportional, the contextual image modeling application 104 classifies each rectangle (and corresponding pixels) as having changes attributed to the shading image or the reflectance image. The contextual image modeling application 104 classifies adjacent pixels that have RGB channels that vary proportionally as part of the shading image. The contextual image modeling application 104 classifies adjacent pixels that have RGB channels that are not varied by the same proportion as part of the reflectance image.

In an embodiment, the contextual image modeling application 104 determines whether the red channels $R_1$ and $R_2$, green channels $G_1$ and $G_2$, and blue channels $B_1$ and $B_2$ of adjacent pixels of electronic image 110 vary proportionally by measuring the corresponding pixel variation to determine if a relationship exists such that $$\frac{R_1}{R_2} = \frac{G_1}{G_2} = \frac{B_1}{B_2} = a,$$

where a represents the proportional change between pixels. For instance, For instance, for a first pixel represented by $c_1$ and an adjacent pixel represented by $c_2$, if $c_1 = ac_2$, the contextual image modeling application 104 classifies the pixels as part of the shading image conclusively. If $c_1 \neq ac_2$, the contextual image modeling application 104 classifies the pixels as part of the reflectance image conclusively. In some cases, the contextual image modeling application 104 determines that the change between two adjacent pixels is inconclusive (e.g., the proportion is skewed for a channel). If a change is inconclusive, the contextual image modeling application 104, for example, propagates results from conclusive pixels to the inconclusive pixels using a suitable propagation technique, such as a Markov Random Field. For example, the contextual image modeling application 104 assumes that nodes in a Markov Random Field along the same contour are classified into the same category (i.e., shading or reflectance).

At block 212, the process 200 involves generating an illuminance map for the rectangular mesh. In some cases, the illuminance map includes, for each rectangle of the rectangular mesh, at least one illuminance value corresponding to the respective rectangle. For instance, the contextual image modeling application 104 generates an illuminance map by combining the computed shading image S(x, y) and a reflectance image R(x, y). In some cases, the illuminance map is represented by Im(x, y)=F(R(x, y), S(x, y)). In some embodiments, in the equation for Im(x, y), the function F computes the product of the reflectance image and the shading image, such as by F(R, S)=R(x, y)*S(x, y).

At block 214, the process 200 involves generating an adjusted mesh structure by adjusting at least one dimension of one or more rectangles in the rectangular mesh based on the illuminance value corresponding to each respective rectangle. The mesh adjustment engine 108 adjusts the rectangular mesh based on the illuminance value at each rectangle. In some cases, the adjusted mesh structure represents a distortion of the rectangular mesh, such as a distortion that increases or decreases dimensions of one or more rectangles in the mesh. The mesh adjustment engine 108 determines the magnitude of the distortion (e.g., adjustment) of each rectangle based on the relative illuminance intensity corresponding to each rectangle. For example, the respective relative illuminance intensity at each rectangle is based on a comparison of the illuminance value for the rectangle and an overall illuminance for the illuminance map. The overall illuminance for the illuminance map is determined based on illuminance values for multiple rectangles (e.g., a maximum illuminance, an average illuminance). A first rectangle has a relatively high relative illuminance intensity if, for example, the first rectangle has an illuminance value that is large with respect to the overall illuminance. A second rectangle has a relatively low relative illuminance intensity if, for example, the second rectangle has an illuminance value that is small with respect to the overall illuminance. In some cases, the distortion $D(x, y)$ is represented by $D(x, y)=(1-R(x, y))$, where an illuminance intensity is based on $(1-R(x, y))$, for a rectangle having a reflectance of $R(x, y)$. In addition, the distortion $D(x, y)$ is represented by $D(x, y)=(1-S(x, y))$, where an illuminance intensity is based on $(1-S(x, y))$, for a rectangle having a shading of $S(x, y)$. In some cases, the distortion $D(x, y)$ is based on a combination of $(1-R(x, y))$ and $(1-S(x, y))$.

In some cases, the mesh adjustment engine 108 determines respective adjustments for the first and second rectangles based on the respective relative illuminance intensities. For example, the first rectangle may have a positive adjustment (e.g., a dimension is increased) based on the relatively high relative illuminance intensity. Additionally or alternatively, the second rectangle may have a negative adjustment (e.g., a dimension is decreased) based on the relatively low relative illuminance intensity. In some cases, a particular rectangle is not distorted (e.g., has an adjustment of about zero), such as if the particular rectangle has an illuminance value that is equal (or approximately equal) to the overall illuminance for the illuminance map. Further details of the adjusted mesh structure may be understood with regard to FIG. 5.

At block 216, the process 200 involves generating a synthetic image component based on a combination of the adjusted mesh structure and an additional image. The additional image, for example, is an electronic image that includes visual content, such as a depiction of a pattern or a texture. In some cases, the combination is based on the one or more adjusted dimensions of the adjusted mesh structure and a pattern depicted in the additional image. In some embodiments, the contextual image modeling application 104 accesses image repository 114 to retrieve the additional image. The contextual image modeling application 104 merges the adjusted mesh structure with the additional image by, for example, selecting from the additional image a group of pixels with locations corresponding to locations of the rectangular blocks in the adjusted mesh. The selected pixels are adjusted according to the distortions of the adjusted mesh structure, such as a color adjustment or a directional adjustment for one of more of the selected pixels. Additional details of merging the adjusted mesh structure and additional image are described with regard to FIG. 6.

At block 218, the process 200 involves generating a contextual composite image based on a combination of the input image and the synthetic image component. In some embodiments, the contextual image modeling application 104 generates the contextual composite image 112 by replacing a portion of the electronic image 110 that depicts the target object with a corresponding portion of the synthetic image component. For example, the contextual image modeling application 104 generates the contextual composite image 112 based on pixels from the synthetic image component that correspond to the target object (or a variation of the target object) and additional pixels from the electronic image 110 that correspond to one or more background elements of the image 110.

Figure 5:
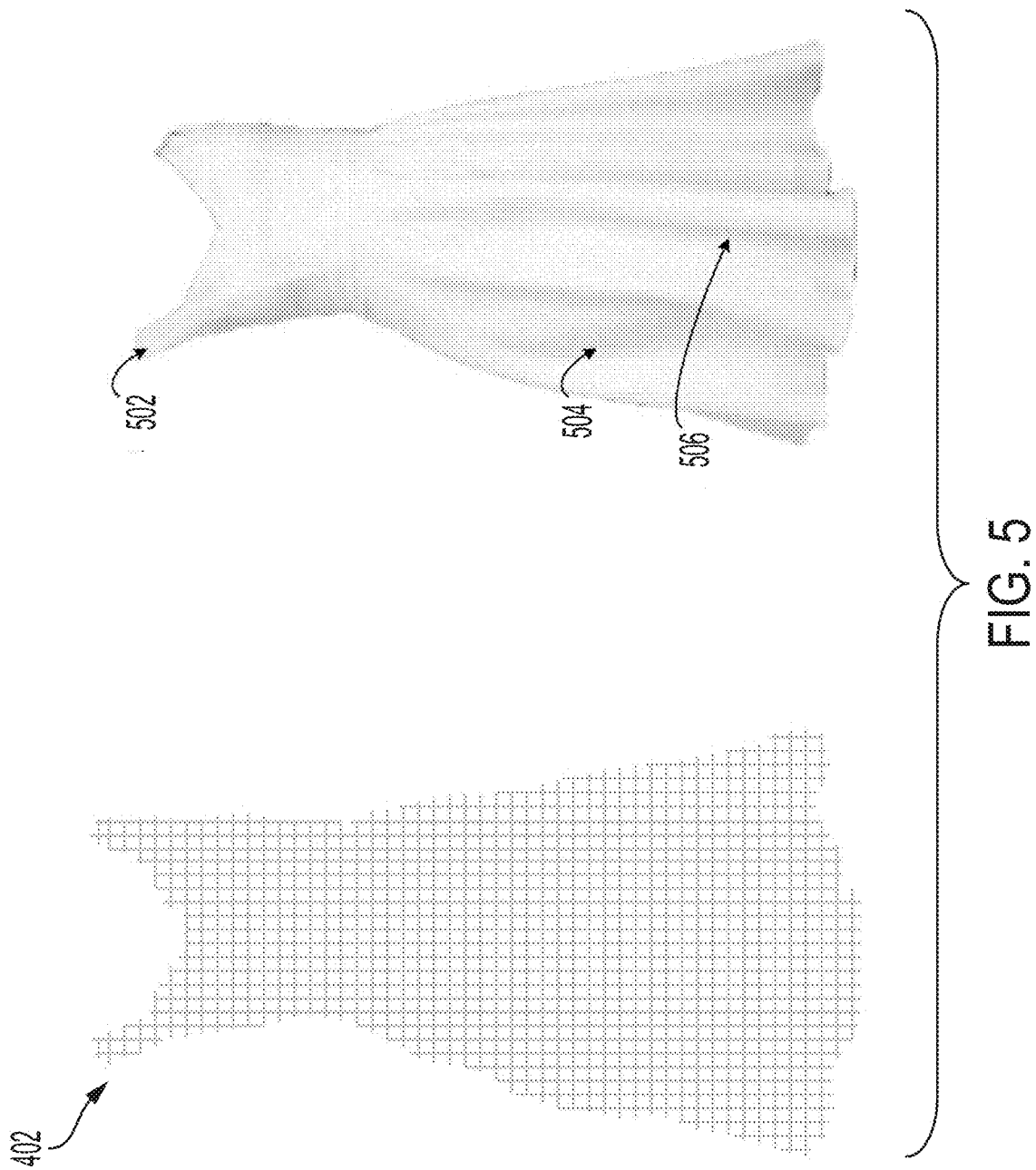
FIG. 5 depicts an example of generating an illuminance map from a rectangular mesh, according to certain embodiments of the present disclosure.

FIG. 5 depicts an example of an illuminance map generated based on a rectangular mesh, according to certain embodiments of the present disclosure. The contextual image modeling application 104 generates one or more of a reflectance image or a shading image based on the rectangular mesh 402. The contextual image modeling application 104 generates an illuminance map 502 from the reflectance image and a corresponding shading image (e.g., an inverse of the reflectance image). For example, the illuminance map is represented by $Im(x, y)=F(R(x, y), S(x, y))$. In some cases, an illuminance value for each rectangle in the mesh is determined based on the illuminance $Im(x, y)$ for one or more pixels corresponding to the rectangle. For instance, an example rectangle representing pixels at locations $x=[1, 2, 3, 4, 5]$ and $y=[1, 2, 3, 4, 5]$ has an illuminance value based on a combination of the illuminance $Im(1, 1)$ through $Im(5, 5)$, such as an average illuminance, a maximum illuminance, or another suitable combination.

In some cases, the contextual image modeling application 104 computes the directional derivatives of each rectangle in two dimensions, such as a horizontal x direction and a vertical y direction. The contextual image modeling application 104 computes at least one set of derivatives (e.g., a set having a horizontal derivative and a vertical derivative) of each rectangle of rectangular mesh 402. In some cases, a first set of derivatives for a particular mesh rectangle is determined based on shading values for the particular mesh rectangle. In addition, a second set of derivatives for the particular mesh rectangle is determined based on reflectance values for the particular mesh rectangle. The contextual image modeling application 104 uses a filter $f_x$ to compute a derivative in the direction of $-x$ and filter $f_y$ to compute an additional derivative in the direction of $-y$. In some cases, $F_x$ and $F_y$ represent estimated derivatives in the respective directions of $-x$ and $-y$. For example, $F_{sx}$ and $F_{sy}$ represent the estimated derivatives of the shading image in the respective directions of $-x$ and $-y$. In addition, $F_{rx}$ and $F_{ry}$ represent the estimated derivatives of the reflectance image in the respective directions of $-x$ and $-y$.

The contextual image modeling application 104 determines the shading image, such as based on an equation $S(x, y)=g_s*[(f_x(-x, -y)*F_{sx})+(f_y(-x, -y)*F_{sy})]$. Additionally or alternatively, the contextual image modeling application 104 determines the reflectance image, such as based on an equation $R(x, y)=g_r*[(f_x(-x, -y)*F_{rx})+(f_y(-x, -y)*F_{ry})]$. In these equations for $S(x, y)$ and $R(x, y)$, the $*$ operator indicates a convolution operation. In addition, $g_s$ is a solution for the equation $\delta_s=g_s*[(f_x(-x, -y)*f_x(x, y))+(f_y(-x, -y)*f_y(x, y))]$ with respect to the shading image, and $g_r$ is a solution for the equation $\delta_r=g_r*[(f_x(-x, -y)*f_x(x, y))+(f_y(-x, -y)*f_y(x, y))]$ with respect to the reflectance image.

In FIG. 5, the illuminance map 502 indicates regions of the rectangular mesh that are characterized by a proportional difference between adjacent pixels. The contextual image modeling application 104 determines these regions as part of the shading image. For example, the contextual image modeling application identifies regions of the mesh that correspond to shading in the input image, such as a region that represents a contextual feature having shadows or other shading. For example, shading regions 504 and 506 depict shadows cast by folds in the dress fabric. The contextual image modeling application 104 determines any number of shading regions, and other shading regions may be shown in FIG. 5 in addition to the shading regions 504 and 506.

Figure 6:
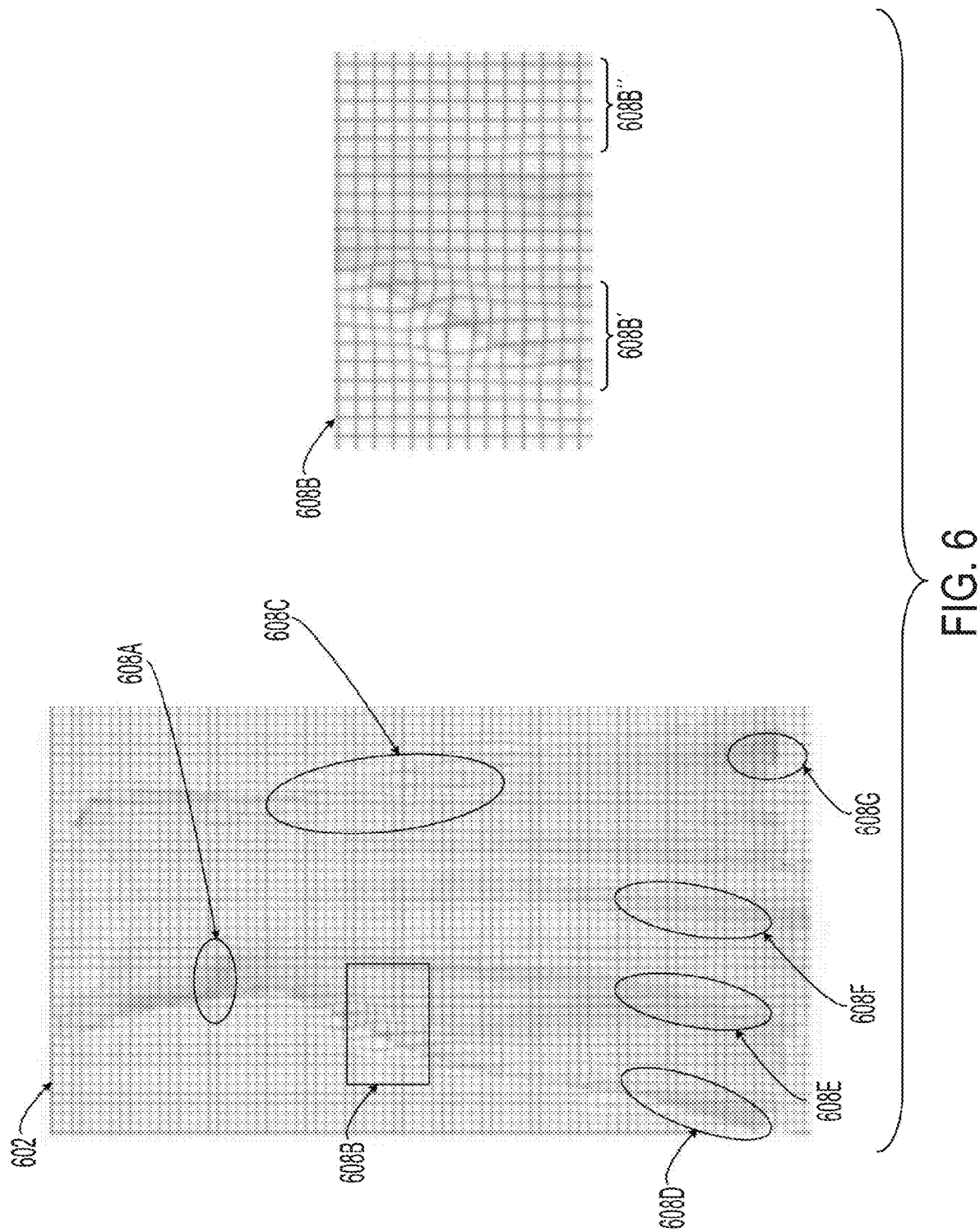
FIG. 6 depicts an example of generating an adjusted mesh structure from an illuminance map, according to certain embodiments of the present disclosure.

FIG. 6 depicts an example of an adjusted mesh structure generated based on an illuminance map, according to certain embodiments of the present disclosure. The mesh adjustment engine 108 determines an illuminance value as described with regard to FIGS. 1 and 2, such as an illuminance value that is normalized (e.g., normalized between 0 and 1). The mesh adjustment engine 108 adjusts the dimensions of each rectangle of adjusted mesh structure 602 according to the determined shading regions of the illuminance map 502. For instance, FIG. 6 illustrates the rectangular mesh 402 with multiple distortion regions 608A-608G. The mesh adjustment engine 108 adjusts the dimensions of the rectangles in the distortion regions 608A-608G based on the magnitude of the illuminance at each rectangle as described with regard to FIG. 2. For example, the mesh adjustment engine 108 adjusts one or more rectangles encompassed in the distortion region 608B (depicted within adjusted mesh structure 602 and in an expanded view of the distortion region 608B). As illustrated in FIG. 6, the mesh adjustment engine 108 adjusts one or more rectangles on a first portion 608B' of the distortion region 608B by adjusting a height, a width, and an aspect ratio of the one or more rectangles as compared to the rectangles on a second portion 608B" of the distortion region 608B. The mesh adjustment engine 108 generates the adjusted mesh structure 602 such that the contextual features (e.g., shading or depth) of the electronic image 110 are represented in the adjusted mesh structure 602.

Figure 7:
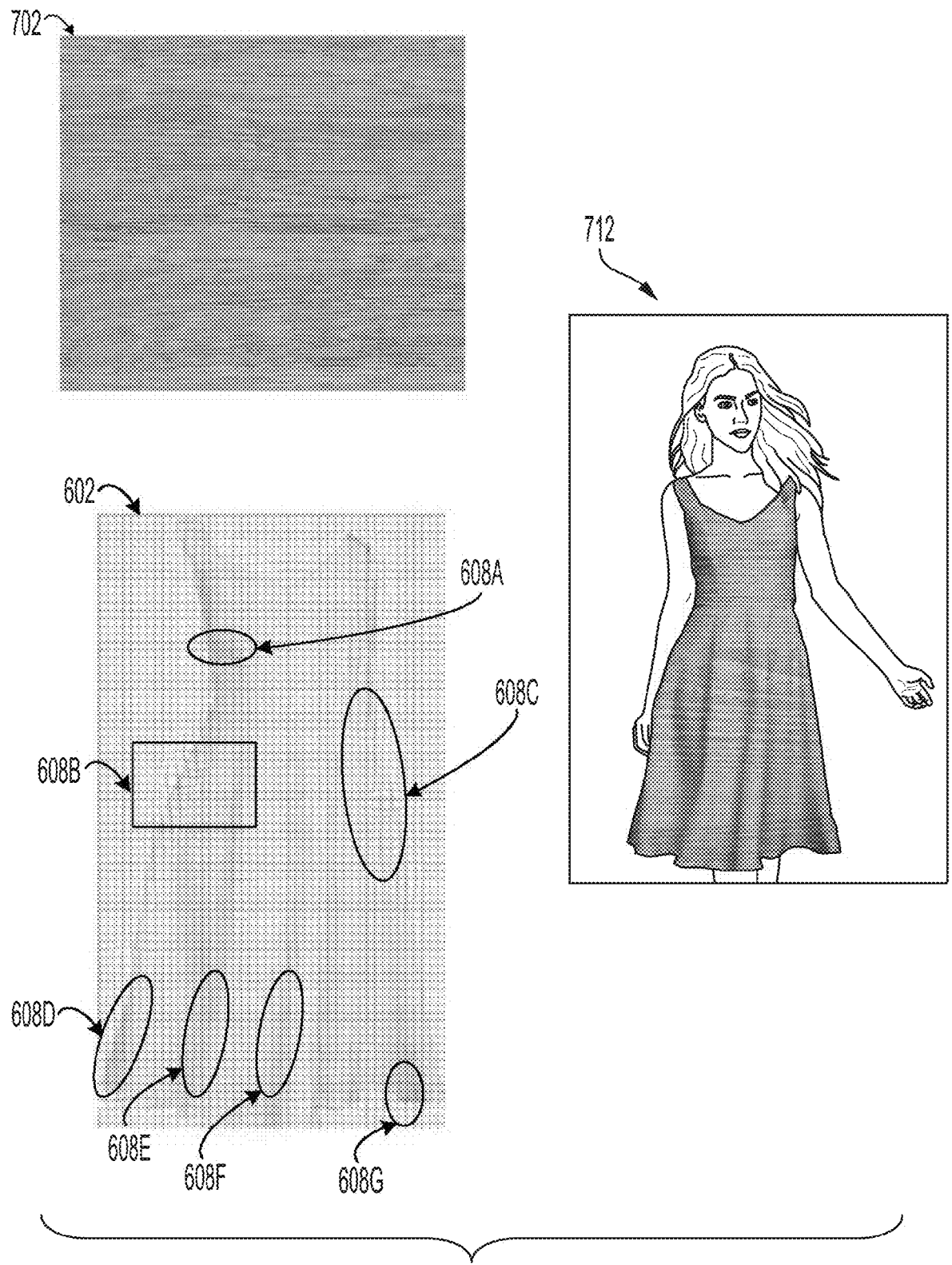
FIG. 7 depicts an example of generating a contextual composite image from an additional image and an adjusted mesh structure, according to certain embodiments of the present disclosure.

FIG. 7 depicts an example of a contextual composite image generated based on an additional image and an adjusted mesh structure, according to certain embodiments of the present disclosure. The contextual image modeling application 104 combines an additional image 702 and adjusted mesh structure 602. For example, the contextual image modeling application 104 combines the shading and reflectance characteristics represented by the adjusted mesh structure 602 with one or more selected pixels from the additional image 702. The contextual image modeling application 104 adjusts the additional image 702 by the distortion regions 608A-608G, such as by adjusting a location or color of one or more of the selected pixels from the additional image 702. The contextual image modeling application 104 generates a contextual composite image 712 based on the combination operation.

Figure 8:
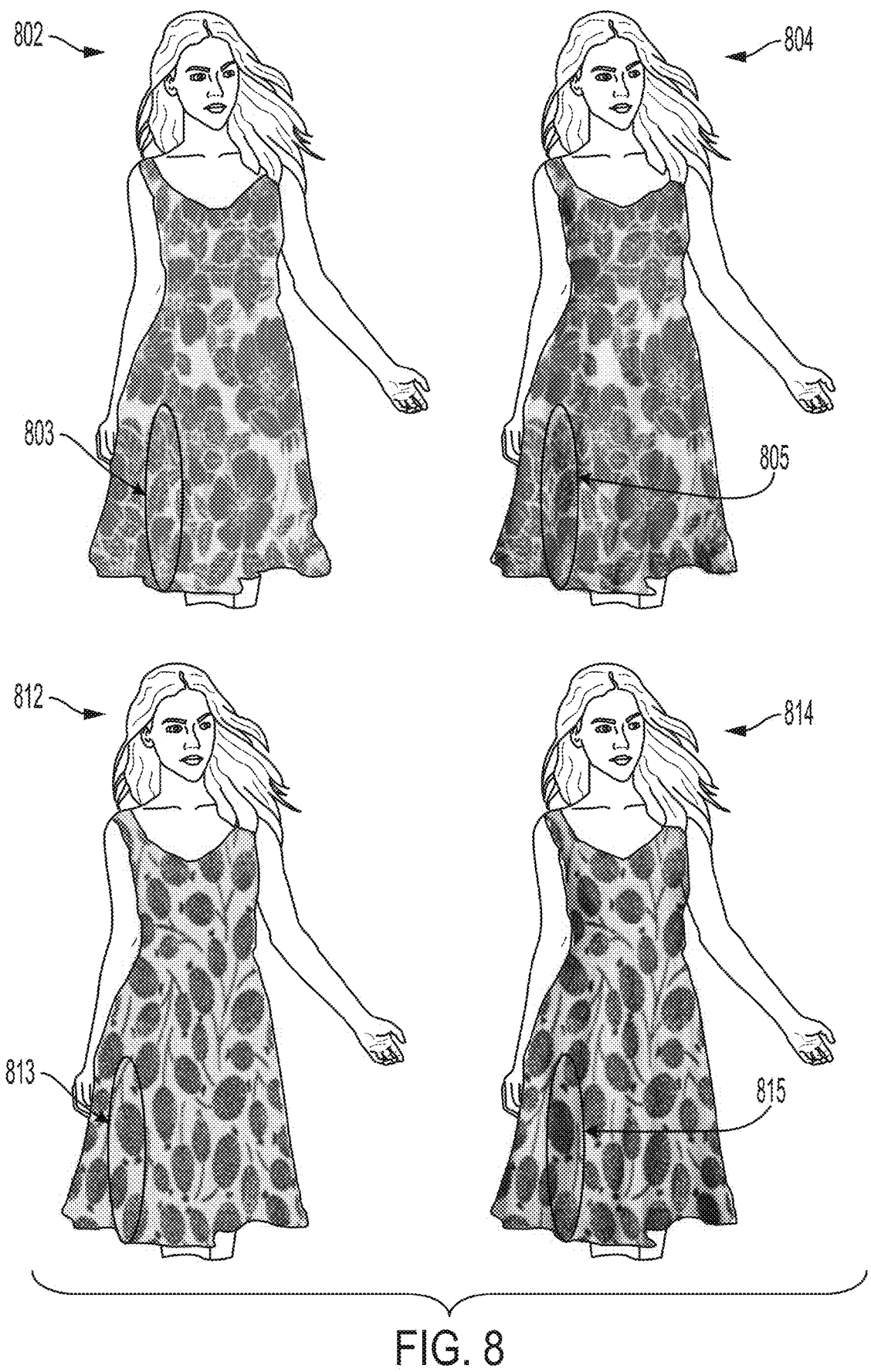
FIG. 8 depicts a comparison of a contextual composite image generated via a contextual image modeling application and a non-contextual image variation generated without using embodiments described herein, according to certain embodiments of the present disclosure.

FIG. 8 depicts examples of a contextual composite image generated via a contextual image modeling application that implements one or more techniques described in the present disclosure and a non-contextual image variation generated without using embodiments described herein. A visual comparison of the non-contextual image variation with the contextual composite image may demonstrate one or more improvements to contextual image characteristics provided by the described techniques. For example, the contextual image modeling application 104 generates a contextual composite image 804 and a contextual composite image 814. In some cases, the contextual composite images 804 and 814 are generated based on the electronic image 110 and one or more additional images, such as additional images depicting images of fabric patterns. As compared with non-contextual images 802 and 812, the contextual composite images 804 and 814 include contextual characteristics of the electronic image 110. Noticeably, the non-contextual images 802 and 812 lack contextual characteristics of the environment in the images, such as shading or depth that is visible in folds of the garment. Comparing non-contextual regions 803 and 813, which lack shading or depth, with contextualized regions 805 and 815, which include shading and depth, the improvement is clearly understood. The contextual image modeling application 104 generates contextual composite images 804 and 814 that accurately represent a contextualized variant of the electronic image 110 including the variations in shading caused by variable reflectance in relation to how the fabric fits to the figure. The contextual image modeling application 104 improves the ability of the contextual composite images 804 and 814 to represent the contextual features of the electronic image 110. The non-contextual images 802 and 812 lack environmental context and merely include cropped versions of an additional image that depicts a pattern. Accordingly, the contextual image modeling application 104 generates contextual composite images 804 and 814 including context which represents an improvement in generating and displaying image content variations, such as may be encountered in an electronic store that demonstrates various fabric options for an apparel item.

Example Equations

In a quantitative example, the electronic image 110 has particular height and width that determine the total area of electronic image 110. The contextual image modeling application 104 generates a binary mask 306 that represents a portion of the electronic image. The area of the binary mask 306 corresponds to a size of the extracted object. The contextual image modeling application 104 generates a rectangular mask that has a number of rectangles N that correspond to the area of the binary mask in pixels. The number of rectangles N is computed based on a relationship of the total area $A_m$ of the binary mask and a granularity that is represented by a base rectangle area (height*width). The contextual image modeling application 104 may represent this computation by the representation $$N = \frac{A_m}{h * w}.$$

The contextual image modeling application 104 computes the derivatives in the X and Y directions to determine the shading image shape that is represented by $S(x, y)=g*[(f_x(-x, -y)*F_x)+(f_y(-x, -y)*F_y)](2)$. The contextual image modeling application 104 uses filters $f_x$ and $f_y$ to compute $\rightarrow -x$ and $\rightarrow -y$ derivatives and $F_x$ and $F_y$ represent the estimated derivatives of the shading image. The * operator represents a convolution operation, and $f_x(-x, -y)$ is a reversed copy of f(x, y). The g term represents the solution of $g*[(f_x(-x, -y)*f_x(x, y))+f_y(-x, -y)*f_y(x, y)]=\delta$ The contextual image modeling application 104 generates an illuminance map by combining the computed shading image S(x, y) and a reflectance image R(x, y). The illuminance map is represented by Im(x, y)=F(R(x, y), S(x, y)). In some embodiments, in the equation for Im(x, y), the function F computes a product (or a scaled product) of the reflectance image and the shading image.

In some embodiments, the mesh adjustment engine 108 computes the distortion by D(x, y)=(1−R (x, y)) where R(x, y) represents the reflectance at each rectangle of the mesh. Additionally or alternatively, the mesh adjustment engine 108 computes the distortion by $D(x, y)=(1-S(x, y))$ where $S(x, y)$ represents the shading at each rectangle of the mesh. In some cases, the distortion $D(x, y)$ is based on a combination of $(1-R(x, y))$ and $(1-S(x, y))$.

The image modeling engine merges the adjusted mesh structure and the additional image by $Om(x, y)=F(T(x, y), D(x, y))$. In some cases, $T(x, y)$ represents pixels of an additional image, such as an additional image that depicts a fabric pattern or texture. In addition, $D(x, y)$ represents distortion (e.g., adjustments) of the rectangular mesh, such as a distortion that increases or decreases dimensions of one or more rectangles in the mesh. In some embodiments, in the equation for $Om(x, y)$, the function F computes the product of the reflectance image and the distortion, such as by $F(T, D)=T(x, y)*D(x, y)$. The $Om(x, y)$ represents the contextualized composite image that in some cases is the product of the additional image and the adjusted mesh structure. The combination of the additional image and the adjusted mesh structure adds contextual features (shading and luminance) to the additional image synthetically. Therefore, the contextualized image modeling application 104 achieves substantial efficiencies by generating a contextualized composite image from an additional image that lacked contextual features and an adjusted mesh structure of extracted contextual features from an electronic image 110.

Example of a Computing System for Implementing Certain Embodiments

Figure 9:
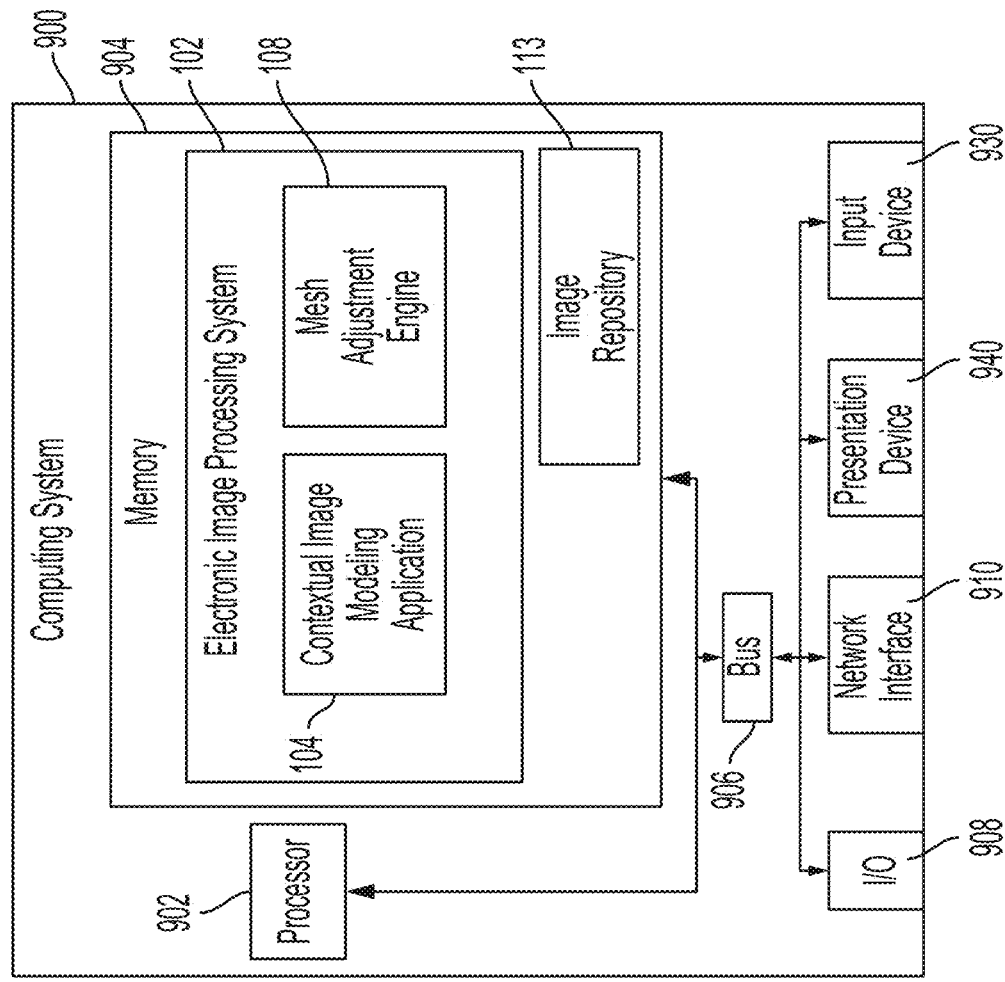
FIG. 9 depicts an example of a computing system for implementing certain embodiments of the present disclosure.

Any suitable computing system or group of computing systems can be used for performing the operations described herein. For example, FIG. 9 depicts an example of a computing system 900. The implementation of computing system 900 could be used for one or more of a contextual image modeling application 104, an image processing engine 106, or a mesh adjustment engine 108. In some embodiments, a single computing system 900 having devices similar to those depicted in FIG. 9 (e.g., a processor, a memory, etc.) combines the one or more operations and data stores depicted as separate systems in FIG. 1. Additionally or alternatively, one or more of the contextual image modeling application 104, the image processing engine 106, or the mesh adjustment engine 108 are implemented on multiple respective computing systems including (but not limited to) the configuration of computing system 900.

The depicted example of a computing system 900 includes a processor 902 communicatively coupled to one or more memory devices 904. The processor 902 executes computer-executable program code stored in a memory device 904, accesses information stored in the memory device 904, or both. Examples of the processor 902 include a microprocessor, an application-specific integrated circuit ("ASIC"), a field-programmable gate array ("FPGA"), or any other suitable processing device. The processor 902 can include any number of processing devices, including a single processing device.

A memory device 904 includes any suitable non-transitory computer-readable medium for the contextual image modeling application 104, the image processing engine 106, or the mesh adjustment engine 108. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 900 may also include a number of external or internal devices, an input device 930, a presentation device 940, or other input or output devices. For example, the computing environment 100 is shown with one or more input/output ("I/O") interfaces 908. An I/O interface 908 can receive input from input devices or provide output to output devices. One or more buses 906 are also included in the computing system 900. The bus 906 communicatively couples one or more components of a respective one of the computing system 900.

The computing system 900 executes electronic image processing system 102 that configures the processor 902 to perform one or more of the operations described herein. Examples of the contextual image modeling application 104 include, in various embodiments, image processing engine 106, mesh adjustment engine 108, or other suitable applications that perform one or more operations described herein (e.g., one or more development applications for generation of the binary mask 306, the rectangular mesh 402, the adjusted mesh structure 602, etc.). The program code may be resident in the memory device 904 or any suitable computer-readable medium and may be executed by the processor 902 or any other suitable processor.

In some embodiments, one or more memory devices 904 stores program data such as parameters and settings for the binary mask 306, the rectangular mesh 402, the adjusted mesh structure 602, or a combination. In additional or alternative embodiments, one or more of the programs, images, modules, and functions described herein are stored in different memory devices 904 accessible via a data network.

In some embodiments, the computing system 900 also includes a network interface device 910. The network interface device 910 includes any device or group of devices suitable for establishing a wired or wireless data connection to one or more data networks. Non-limiting examples of the network interface device 910 include an Ethernet network adapter, a modem, and/or the like. The computing system 900 is able to communicate with one or more other computing devices (e.g., a computing device executing image processing engine 106, mesh adjustment engine 108, etc.) via a data network using the network interface device 910. In some cases, the computing system 900 receives inputs from or provides outputs to one or more additional computing systems via the network interface 910. For example, the computing system 900 receives, from a computing device operated by a graphical image editor, an input indicating an input image and one or more additional images (e.g., multiple images of fabric patterns). Based on the received input, the computing system 900 performs computing operations related to generating contextualized synthetic image variants, as described herein. The computing system 900 provides, to the computing device for the graphical image editor, an output indicating one or more contextual composite images that represent the contextualized image variants.

In some embodiments, the computing system 900 also includes the input device 930 and the presentation device 940 depicted in FIG. 9. An input device 930 can include any device or group of devices suitable for receiving visual, auditory, or other suitable input that controls or affects the operations of the processor 902. Non-limiting examples of the input device 930 include a touchscreen, a mouse, a keyboard, a microphone, a separate mobile computing device, etc. A presentation device 940 can include any device or group of devices suitable for providing visual, auditory, or other suitable sensory output. Non-limiting examples of the presentation device 140 include a touch-screen, a monitor, a speaker, a separate mobile computing device, etc.

Although FIG. 9 depicts the input device 930 and the presentation device 940 as being local to the computing device that executes the contextual image modeling application 104, other implementations are possible. For instance, in some embodiments, one or more of the input device 930 and the presentation device 940 can include a remote client-computing device that communicates with the computing system 900 via the network interface device 910 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method for generating a contextual composite image, wherein the method includes operations comprising:
    generating a rectangular mesh comprising rectangles corresponding to respective portions of a target object depicted in an input image;
    determining illuminance values corresponding to the rectangles, respectively, wherein determining each illuminance value for each respective rectangle comprises (i) computing a directional derivative and (ii) determining a classification of the respective rectangle based on the directional derivative, the classification indicating a shading or a reflectance of a respective portion of the target object corresponding to the respective rectangle;
    adjusting a dimension of a rectangle from the rectangular mesh based on an illuminance value corresponding to the rectangle;
    generating a synthetic image component based on the adjusted dimension of the rectangle and a pattern depicted in an additional image; and
    generating a contextual composite image based on a combination of the input image and the synthetic image component.

2. The method of claim 1, wherein adjusting the dimension of the rectangle comprises:
    generating an illuminance map for the rectangular mesh, the illuminance map comprising the illuminance values for the rectangles, respectively, wherein the illuminance map is generated as a function of a shading image and a reflectance image, wherein the input image is a product of the shading image and the reflectance image;
    computing a relative intensity of the illuminance value corresponding to the rectangle, wherein the relative intensity is based on a comparison of the illuminance value and an overall illuminance of the illuminance map;
    computing an additional relative intensity of an additional illuminance value corresponding to an additional rectangle, wherein the additional relative intensity is based on a comparison of the additional illuminance value and the overall illuminance; and
    based on the relative intensity for the rectangle being greater than the additional relative intensity, adjusting the dimension of the rectangle by increasing at least one of a height, a width, or an aspect ratio of the rectangle.

3. The method of claim 1, wherein generating the synthetic image component comprises:
    adjusting a location of a particular pixel of the additional image based on a corresponding illuminance value of a particular rectangle that corresponds to the particular pixel.

4. The method of claim 1, wherein generating the contextual composite image comprises replacing one or more pixels of the input image with one or more pixels of the synthetic image component.

5. The method of claim 1, the operations further comprising:

determining, by a neural network trained to identify objects with contextual features in input images, a boundary that separates the target object from a background element depicted in the input image; and extracting the boundary of the target object depicted in the input image.

6. The method of claim 1, wherein determining the classification indicating shading or reflectance comprises:

computing a relationship between a first rectangle of the respective rectangles, and an adjacent rectangle of the rectangular mesh;

determining that the relationship between the first rectangle and the adjacent rectangle is a scalar value; and based on the relationship having a scalar value, determining the classification of the first rectangle as shading.

7. The method of claim 1, wherein determining a classification for each derivative as a shading or reflectance image comprises:

computing a relationship between a first rectangle of the respective rectangles, and an adjacent rectangle of the rectangular mesh;

determining that the relationship between the first rectangle and the adjacent rectangle is a non-scalar value; and based on the relationship having a non-scalar value, determining the classification of the first rectangle as reflectance.

8. A non-transitory computer-readable medium embodying program code for generating a contextual composite image, the program code comprising instructions which, when executed by a processor, cause the processor to perform operations comprising:

generating a rectangular mesh comprising rectangles corresponding to respective portions of a target object depicted in an input image;

determining illuminance values corresponding to the rectangles, respectively, wherein determining each illuminance value for each respective rectangle comprises (i) computing a directional derivative identifying a change in luminance along a width or height of the rectangle and (ii) determining a classification of the respective rectangle based on the directional derivative, the classification indicating a shading or a reflectance of a respective portion of the target object corresponding to the respective rectangle;

adjusting a dimension of a rectangle from the rectangular mesh based on an illuminance value corresponding to the rectangle;

generating a synthetic image component based on the adjusted dimension of the rectangle and a pattern depicted in an additional image; and generating a contextual composite image based on a combination of the input image and the synthetic image component.

9. The non-transitory computer-readable medium of claim 8, wherein adjusting the dimension of the rectangle comprises:

generating an illuminance map for the rectangular mesh based on the illuminance values corresponding to the rectangles;

computing a relative intensity of the illuminance value corresponding to the rectangle, wherein the relative intensity is based on a comparison of the illuminance value and an overall illuminance of the illuminance map; and based on the relative intensity for the rectangle, adjusting the dimension of the rectangle by adjusting at least one of a height, a width, or an aspect ratio of the rectangle.

10. The non-transitory computer-readable medium of claim 8, wherein generating the synthetic image component comprises:

adjusting a location of a particular pixel of the additional image based on a corresponding illuminance value of a particular rectangle that corresponds to the particular pixel.

11. The non-transitory computer-readable medium of claim 8, wherein generating the contextual composite image comprises replacing one or more pixels of the input image with one or more pixels of the synthetic image component.

12. The non-transitory computer-readable medium of claim 8, wherein determining the classification indicating shading or reflectance comprises:

computing a relationship between a first rectangle of the respective rectangles, and an adjacent rectangle of the rectangular mesh;

determining that the relationship between the first rectangle and the adjacent rectangle is a scalar value; and based on the relationship having a scalar value, determining the classification of the first rectangle as shading.

13. The non-transitory computer-readable medium of claim 8, wherein determining a classification for each derivative as a shading or reflectance image comprises:

computing a relationship between a first rectangle of the respective rectangles, and an adjacent rectangle of the rectangular mesh;

determining that the relationship between the first rectangle and the adjacent rectangle is a non-scalar value; and based on the relationship having a non-scalar value, determining the classification of the first rectangle as reflectance.

14. A system for generating a contextual composite image, the system comprising:

a means for generating a rectangular mesh comprising rectangles corresponding to respective portions of a target object depicted in an input image;

a means for determining illuminance values corresponding to the rectangles, respectively, wherein determining each illuminance value for each respective rectangle comprises (i) computing a directional derivative and (ii) determining a classification of the respective rectangle based on the directional derivative, the classification indicating a shading or a reflectance of a respective portion of the target object corresponding to the respective rectangle;

a means for adjusting a dimension of a rectangle from the rectangular mesh based on an illuminance value corresponding to the rectangle;

a means for generating a synthetic image component based on the adjusted dimension of the rectangle and a pattern depicted in an additional image; and a means for generating a contextual composite image based on a combination of the input image and the synthetic image component.

15. The system of claim 14, wherein adjusting the dimension of the rectangle comprises:

generating an illuminance map for the rectangular mesh based on the illuminance values corresponding to the rectangles;

computing a relative intensity of the illuminance value corresponding to the rectangle, wherein the relative intensity is based on a comparison of the illuminance value and an overall illuminance of the illuminance map; and based on the relative intensity for the rectangle being greater than an additional relative intensity for another rectangle in the rectangular mesh, adjusting the dimension of the rectangle by increasing at least one of a height, a width, or an aspect ratio of the rectangle.

16. The system of claim 14, wherein generating the synthetic image component comprises:

adjusting a location of a particular pixel of the additional image based on a corresponding illuminance value of a particular rectangle that corresponds to the particular pixel.

17. The system of claim 14, wherein generating the contextual composite image comprises replacing one or more pixels of the input image with one or more pixels of the synthetic image component.

18. The system of claim 14, further comprising:

a means for determining, by a neural network trained to identify objects with contextual features in input images, a boundary that separates the target object from a background element depicted in the input image; and a means for extracting the boundary of the target object depicted in the input image.

19. The system of claim 14, wherein determining the classification indicating shading or reflectance comprises:

computing a relationship between a first rectangle of the respective rectangles, and an adjacent rectangle of the rectangular mesh;

determining that the relationship between the first rectangle and the adjacent rectangle is a scalar value; and based on the relationship having a scalar value, determining the classification of the first rectangle as shading.

20. The system of claim 14, wherein determining a classification for each derivative as a shading or reflectance image comprises:

computing a relationship between a first rectangle of the respective rectangles, and an adjacent rectangle of the rectangular mesh;

determining that the relationship between the first rectangle and the adjacent rectangle is a non-scalar value; and based on the relationship having a non-scalar value, determining the classification of the first rectangle as reflectance.

* * * * *